Sept. 29, 1953    J. D. BENEFIELD    2,653,564
HYDRAULIC SYSTEM AIR TRAP
Filed May 15, 1951
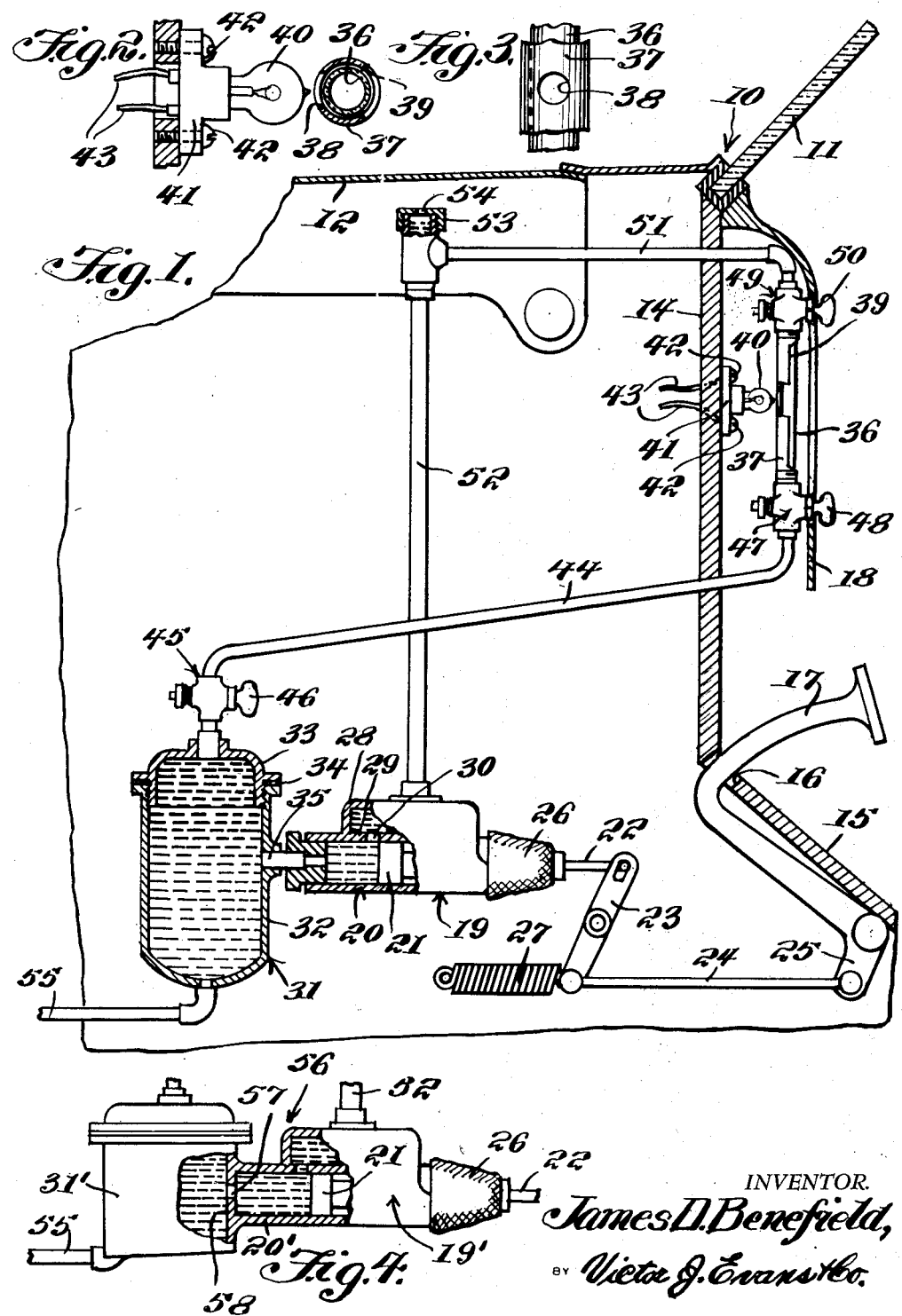
INVENTOR.
James D. Benefield,
BY Victor J. Evans & Co.
ATTORNEYS Patented Sept. 29, 1953

2,653,564

UNITED STATES PATENT OFFICE 2,653,564

HYDRAULIC SYSTEM AIR TRAP

James Dewey Benefield, Decatur, Ga.

Application May 15, 1951, Serial No. 226,418

3 Claims. (Cl. 116—118)

This invention relates to a hydraulic brake system for a vehicle, airplane or the like, and more particularly to an air trap for a hydraulic brake system.

The object of the invention is to provide an air trap which will indicate to the operator of the vehicle when the level of fluid in the hydraulic system drops below a predetermined level, whereby the fluid can be replaced.

Another object of the invention is to provide a mechanism which will readily trap any air that accidentally enters the hydraulic brake system, the mechanism of the present invention enabling the air to be easily bled from the brake system, the trap insuring against brake failure that results from insufficient brake fluid and being adapted to be used with existing master cylinders and requiring no adjustments and having no moving parts.

A further object of the invention is to provide a hydraulic system air trap which is extremely simple and inexpensive to manufacture.

Other objects and advantages will be apparent during the course of the following description.

In the accompanying drawings forming a part of this application and in which like numerals are used to designate like parts throughout the same:

Figure 1 is a fragmentary sectional view taken through a vehicle, showing the air trap of the present invention installed in the hydraulic brake system;

Figure 2 is a horizontal sectional view taken through the indicating gauge;

Figure 3 is a fragmentary elevational view of the indicator gauge;

Figure 4 is a side elevational view, with parts broken away and in section, showing a modified trap assembly.

Referring in detail to Figures 1, 2 and 3 of the drawings, the numeral 10 designates a portion of a vehicle, such as an automobile, and the vehicle 10 includes the usual windshield 11, hood 12 and cowl partition 14. Formed integrally with the lower end of the partition 14, or secured thereto, is an inclined floor board 15, Figure 1, there being an opening 16 arranged in the floor board 15 for the projection therethrough of the foot pedal 17. A portion of the instrument panel in designated by the numeral 18.

Further, the numeral 19 designates the master cylinder for the vehicle hydraulic brake system, and the master cylinder 19 includes a body portion 20 that has a plunger or piston 21 slidably or reciprocably arranged therein. A rod 22 is connected to the plunger 21, the rod 22 projecting through a cover 26 that is mounted on the master cylinder 19. The rod 22 is connected to a lever 24 by means of a link 23, and a link 25 connects the lever 24 to the brake pedal 17. A return spring 27 is operatively connected to the lever 24. Thus, when the brake pedal 17 is depressed by the application of pressure from the driver's foot, the plunger 21 will be reciprocated so that hydraulic fluid will flow from the master cylinder 19 through the operating cylinders mounted on the vehicle wheels, whereby the forward motion of the vehicle will be arrested.

The present invention is directed to a trap whereby any air that accidentally enters the hydraulic brake system will not cause failure of the brakes and wherein the operator of the vehicle will readily be able to observe that air has entered the system. Arranged integrally with the top of the body portion 20 or secured thereto is a casing 28, the casing 28 being mounted on the top wall 29 of the body portion. An opening 30 serves to permit hydraulic fluid to flow from the body portion 20 into the casing 28.

Arranged contiguous to the master cylinder 19 is a housing 31 which includes a lower portion 32, and a cap 33 is connected to the lower portion 32, there being a gasket 34 interposed between the cap 33 and the lower portion 32 so as to insure that a fluid tight seal is provided. A conduit 35 serves to connect an end of the body portion 20 to the housing 31.

Arranged rearwardly of the instrument panel 18 is a glass tube 36, Figures 1, 2 and 3. The glass tube 36 is surrounded by a case 37, and the case 37 is provided with a pair of cutouts or openings 38 and 39, for the projection therethrough of lightrays. For illuminating the glass tube 36, so that the operator of the vehicle will be readily able to observe the fluid in the tube 36, a light bulb 40 is supported by a bracket 41, the bracket 41 being secured to the partition 14 by suitable securing elements, such as screws 42. Electric wires 43 lead from the light bulb 40 for connecting the bulb 40 to a source of electrical energy.

A conduit 44 extends from the top of the housing 31 to the lower end of the tube 36, and a pet cock 45 is arranged in the conduit 44 adjacent the housing 31, there being a handle 46 for actuating the pet cock 45. A similar pet cock 47 is arranged adjacent the lower end of the tube 36, and a handle 48 projects through the instrument panel 18 for actuating the pet cock 47. Arranged contiguous to the top of the tube 36 is a pet cock 49 which is operated by a handle 50 that projects through the instrument panel 18. A conduit 51 extends from the top of the tube 36 for a purpose to be later described.

Extending upwardly from the casing 28 and communicating therewith is a vertically disposed pipe 52. A filler cap 53 is mounted on the upper end of the pipe 52, there being a vent opening 54 arranged in the filler cap 53. The conduit 51 communicates with the top of the pipe 52. A conduit 55 extends from the bottom of the housing 31, and the conduit 55 is adapted to convey hydraulic fluid from the housing 31 to the operating cylinders arranged on the vehicle wheels.

Referring to Figure 4 of the drawings, there is shown a modified assembly wherein the housing 31' and master cylinder 19' are formed integrally, or secured together. Thus, in Figure 4, the master cylinder and air trap housing are generally indicated by the numeral 56, and the unit 56 includes the master cylinder 19' which has its body portion 20' extending from the side wall 58 of the housing 31'. An opening 57 is arranged in the side wall 58, whereby hydraulic fluid can readily flow to and from the housing 31' and body portion 20'.

From the foregoing, it is apparent that a mechanism has been provided for increasing the safety of hydraulic brake systems used in vehicles, such as automobiles, or hydraulic systems used in airplanes or other bodies. In order to insure that there is a positive hydraulic braking action, there must be no air in any part of the braking system, such as the master cylinder or any of the fluid branches of the automobile or airplane. By means of the mechanism of the present invention, the air is trapped before it gets up to the main branches of the brake system, and this air is expelled before it causes any brake failures or damage. This air is expelled quickly, efficiently and conveniently by the driver of the automobile while the driver is sitting in the driver's seat, and can be accomplished even when the vehicle is in motion, whereas, with the previous hydraulic brake systems there is no way for the driver to determine when the brake fluid is getting low without removing the floor board of the vehicle and checking the master cylinder.

After the trap of the present invention has been installed and filled with brake fluid and the four brake lines leading to the operating cylinders on the vehicle wheels have been properly bled, it will not be possible for air to enter the brake line. Instead, air will accumulate in the glass tube 36 and act as a warning to the driver. Then the driver of the vehicle can have hydraulic fluid added until it is visible in the tube 36. Then, by pumping the brake pedal 17, all of the air will rise into the tube 36 and be released through pet cock 49, the pet cock 49 being normally kept closed. This air will then pass through the conduit 51 and through the opening 54 in the cap 53, the cap 53 serving to prevent dust and dirt from entering the system and the opening 54 acts as a breather vent for the hydraulic system.

The mechanism of the present invention for trapping air is adapted to be used with existing hydraulic systems wherein the housing or tank 31 is arranged between the master cylinder 19 and the brake line 55. With hydraulic brake systems now in use, low brake fluid in the master cylinder permits air to get into the brake line 55, and this causes brake failure or accidents. This air has to be bled from the brake line in each wheel which necessitates getting under the vehicle or having a mechanic do it. By means of the present invention, in the event the brake fluid in the master cylinder 19 gets low enough to permit air to enter the housing 31, this air will not be able to enter the brake line 55. When the brake system is to be refilled with hydraulic fluid for normal operation, the cap 53 can be removed, the cap 53 being located beneath the hood 12 of the vehicle. This hydraulic fluid can be poured into the system until the hydraulic fluid level can be seen through the filler opening. The hydraulic fluid fills the entire system up to a point between the pet cock 49 and the return conduit 51, and the pipe 52 is also normally filled up to the same level. The lower end of the pipe 52 is connected to the master cylinder 19 by a suitable fluid-tight connecting means which replaces the master cylinder filler plug previously used. After the brake system has been filled to the specified level, the brake pedal 17 is pumped, and this causes the hydraulic fluid to be pumped from the filler pipe 52. This forces all of the air in front of the piston 21 through the conduit 35 and into housing 31. The housing 31 is filled with brake fluid, so that all of the air which enters the housing or tank 31 will travel upwardly through the normally open pet cock 45, then through the conduit 44 and through the open pet cock 47 into the glass tube or gauge 36. The tube 36 may be enclosed in a protective open-front metal shield or casing 37 which may be observed through suitable openings in the instrument panel 18.

The driver of the vehicle presses on the brake pedal 17 and then opens the pet cock 49 which is normally closed, and the pet cock 49 when opened will bleed all of the air from the system which is dispelled through the return pipe 51 and breather cap 53. Any brake fluid which might pass up through the conduit 51 and pet cock 49 while it is open during the bleeding process will return to the master cylinder 19 through the pipe 52. After this bleeding operation, sufficient fluid should be added to bring the level up above the pet cock 49. Then the pet cock 49 is closed for normal operation.

After the hydraulic system air trap of the present invention has been installed and properly bled, it will warn the driver of a vehicle, such as an automobile, before the vehicle is out of brake fluid, because when the brake fluid gets too low in the system, a lower reading will be shown on the tube 36. The light bulb 40 may be electrically connected so that each time the brakes are applied, the light 40 will be energized. Thus, when the fluid in the tube 36 is below a certain level, the light rays will be of different intensity or brightness so as to provide an additional warning.

In the event the tube 36 becomes accidentally broken, the pet cock 47 can be closed and the normal operation of the brakes will not be interfered with. Then, the tube 36 can be replaced. Further, it will be seen that before the brake fluid becomes low enough to permit air to enter the brake line 55, the vehicle would have no brakes at all, because the air would displace so much fluid in the tank 31 that it would be impossible to compress the air enough to give effective brakes. However, by refilling the master cylinder 19, all of the air could be pumped out through the pet cock 49 and conduit 51. In the event the conduit 44 breaks, the pet cock 45 can be closed so that the brakes can be used in their normal manner. Further, if the entire system were cut off at pet cock 45, a convenient and effective bleeder system would still be provided.

In Figure 4, the conduit 35 is eliminated and the master cylinder 19' communicates with the tank 31' through the opening 57. The unit 56 of Figure 4 is adapted to be used in lieu of and in the same manner as the previously-described master cylinder 19 and tank 31.

The air trap of the present invention is simple and inexpensive to manufacture and provides an advance warning to the driver of a vehicle that the vehicle's hydraulic brake system will soon need additional fluid, and even if the driver is negligent or careless and permits the brake fluid to become low enough so that air can enter the master cylinder, this air can be easily and immediately trapped. Then, upon refilling the system with brake fluid, the system can be easily, conveniently, and economically bled by the car driver right from the driver's seat. The conduit 44 and the pipe 52 act as reservoirs for the fluid to be used by the master cylinder 19, and since the breather cap 53 is located below the hood 12, the cap is readily and conveniently accessible. Further, the system can be kept in perfect working order by the vehicle owner except in case of a broken fluid line or worn out brake pistons and the trap has no moving parts and requires no adjustments. Further, the trap is adapted to be used with master cylinders which are already in existence, as the threaded connections may be standard automobile brake connections.

What is claimed is:

1. In a hydraulic brake system, the combination with a master cylinder, a plunger arranged in said master cylinder, a brake pedal for operating said plunger, of a mechanism for trapping air including a housing arranged in communication with said master cylinder, a vertically disposed tube constituting an indicating gauge, a conduit connecting said tube to said housing, a light bulb for illuminating the tube, and pet cocks adjacent the ends of said tube for controlling flow of hydraulic fluid through said conduit and tube.

2. In a hydraulic brake system for a vehicle, the combination with an instrument panel, a vertically disposed partition arranged in the vehicle, a hood arranged in the front of the vehicle, a floor board provided with an opening therein extending angularly from the lower end of said partition, a master cylinder including a body portion provided with an opening in its top, a casing arranged on the upper portion of said body portion, a plunger slidably arranged in said body portion, a brake pedal extending through the opening in said floor board for actuating said plunger, a housing communicating with said body portion and adapted to be connected to the actuating cylinders on the vehicle wheels, a cap connected to the upper end of said housing, a glass tube arranged rearwardly of said instrument panel, a case enclosing said tube and provided with cutouts for the projection therethrough of light rays, a light bulb mounted on said partition behind said tube for illuminating said tube, a pair of pet cocks arranged on the ends of said tube, a conduit connecting the lower end of the tube to said housing, a pet cock arranged in said conduit adjacent said housing, a pipe extending upwardly from said casing, a filler cap provided with an aperture seated on the upper end of said pipe, and a conduit extending from said pipe to the upper end of said tube.

3. In a hydraulic brake system for a vehicle, a master cylinder including a body portion provided with an opening in its top, a casing arranged on the upper portion of said body portion, a plunger slidably arranged in said body portion, a brake pedal for actuating said plunger, a housing communicating with said body portion, a cap connected to the upper end of said housing, a glass tube, a casing enclosing said tube and provided with cut-outs for the projection therethrough of light rays, a light bulb positioned behind said tube for illuminating said tube, a pair of petcocks arranged on the ends of said tube, a conduit connecting the lower end of the tube to said housing, a petcock arranged in said conduit adjacent said housing, a pipe extending upwardly from said casing, a filler cap provided with an aperture seated on the upper end of said pipe, and a conduit extending from said pipe into the upper end of said tube.

JAMES DEWEY BENEFIELD.

References Cited in the file of this patent

UNITED STATES PATENTS

| Number | Name | Date |
|---|---|---|
| 850,483 | Miser | Apr. 16, 1907 |
| 1,564,701 | Mattingly | Dec. 8, 1925 |
| 1,617,020 | Merwin | Feb. 8, 1927 |
| 1,661,029 | Boyd | Feb. 28, 1928 |
| 1,681,030 | Duesenberg | Aug. 14, 1928 |
| 2,141,325 | Werder | Dec. 27, 1938 |